United States Patent [19]

Bichel

[11] Patent Number: 4,754,700

[45] Date of Patent: Jul. 5, 1988

[54] APPARATUS FOR COOKING VEGETABLES

[76] Inventor: Ronald A. Bichel, 3141 Highway K South, Hartford, Wis. 53027

[21] Appl. No.: 835,522

[22] Filed: Mar. 3, 1986

[51] Int. Cl.$^4$ .......................... A23L 3/00; A23L 1/212
[52] U.S. Cl. .................................... 99/443 C; 426/511
[58] Field of Search ..................... 99/443 C, 404, 405, 99/407; 426/511, 508, 523

[56] References Cited

U.S. PATENT DOCUMENTS

| | | | |
|---|---|---|---|
| 1,647,872 | 11/1927 | Leavitt | 99/443 C |
| 2,676,632 | 4/1954 | Hook et al. | 99/443 C |
| 3,456,578 | 7/1969 | Pinsly | 99/443 C |
| 3,581,652 | 6/1971 | Chauvin | 99/443 C |
| 3,910,175 | 10/1975 | Smith | 99/443 C |
| 4,363,263 | 12/1982 | Williams | 99/443 C |
| 4,582,047 | 4/1986 | Williams | 99/443 C |
| 4,614,660 | 9/1986 | Weibye | 426/511 |

FOREIGN PATENT DOCUMENTS 43-756  1/1968  Japan ................. 99/443 C

*Primary Examiner*—James Kee Chi
*Attorney, Agent, or Firm*—Thomas F. Kirby

[57] ABSTRACT

A method for cooking potatoes in hot water-vapor consists of disposing dried potatoes in non-overlapped, non-contacting relationship above a body of boiling water so as to expose them for about five minutes to a confined body of hot water vapor maintained at atmospheric pressure. The apparatus comprises a water container for a body of water, a heat source to heat and maintain said body of water at its boiling point, a perforated motor-driven movable conveyor structure on which diced potatoes can be arranged in non-overlapped, non-contacting relationship and which is located closely above the surface of the body of water, and an enclosure overlying the conveyor structure and the water container for entrapping hot water-vapor there or within so as to expose the diced potatoes thereto, said container having apertures therein so as to maintain the hot water-vapor at substantial atmospheric pressure.

1 Claim, 1 Drawing Sheet

APPARATUS FOR COOKING VEGETABLES

BACKGROUND OF THE INVENTION

1. Field of Use

This invention relates generally to a method and apparatus for cooking vegetables, such as diced potatoes or the like, in hot water-vapor.

2. Description of the Prior Art

In the food processing industry it is necessary to provide large batches of cooked, diced or sliced potatoes for use in the commercial preparation of large quantities of potato salad or other products. The cooked potatoes can be used directly or can be frozen for future use. Heretofore, this was done in either of two ways; namely, by boiling diced or sliced potatoes for about five minutes in a continuous boiling water or by steam blanching diced or sliced potatoes in a non-pressurized container for about fifteen minutes using saturated unpressurized steam injected from a boiler. Typically, boiled, diced or sliced potatoes are used directly for potato salad and blanched, diced or sliced potatoes are frozen and later thawed by wholesale or retail customers, and fried to produce a finished product. However, boiling removes starch and flavor from the diced or sliced potatoes and blanching, while converting the sugar in the potatoes to starch and providing for uniform color when subsequently fried, does adversely affect the flavor. Therefore, it is desirable to provide an improved method and apparatus for cooking diced or sliced potatoes or the like.

SUMMARY OF THE INVENTION

A method for cooking potatoes in hot water-vapor consists of disposing dried potatoes in non-overlapped, non-contacting relationship above a body of boiling water so as to expose them for about five minutes to a confined body of hot water vapor maintained at atmospheric pressure. The apparatus comprises a water container for a body of water, a heat source to heat and maintain said body of water at its boiling point, a perforated motor-driven movable conveyor structure on which diced potatoes can be arranged in non-overlapped, non-contacting relationship and which is located closely above the surface of the body of water, and an enclosure overlying the conveyor structure and the water container for entrapping hot water-vapor there or within so as to expose the diced potatoes thereto, said container having apertures therein so as to maintain the hot water-vapor at substantial atmospheric pressure.

The present invention offers numerous advantages over the prior art. For example, the method and apparatus is automatic. Product flow is continuous via a wire mesh conveyor belt or the like. No hand labor is involved. Thorough, even heat results and no cold spots occur.

The heat source can use natural or LP gas or fuel oil. Heat is supplied through an immersion tube directly to the water to produce hot water-vapor. Steam from an outside boiler directed through a shell or tube heat exchanger could be used. Return condensation can be recovered to enhance thermal efficiency.

The cooking medium is hot water-vapor produced by boiling water. This produces the highest equal moisture saturation in the atmosphere between the surface of the water and the hood of the machine. This causes even, thorough cooking. The hot water-vapor does not "bleach" out starches and nutrients and the cooked product retains its flavor and color.

Other objects and advantages will hereinafter appear.

DRAWINGS

DESCRIPTION OF PREFERRED EMBODIMENTS

Figure 3:
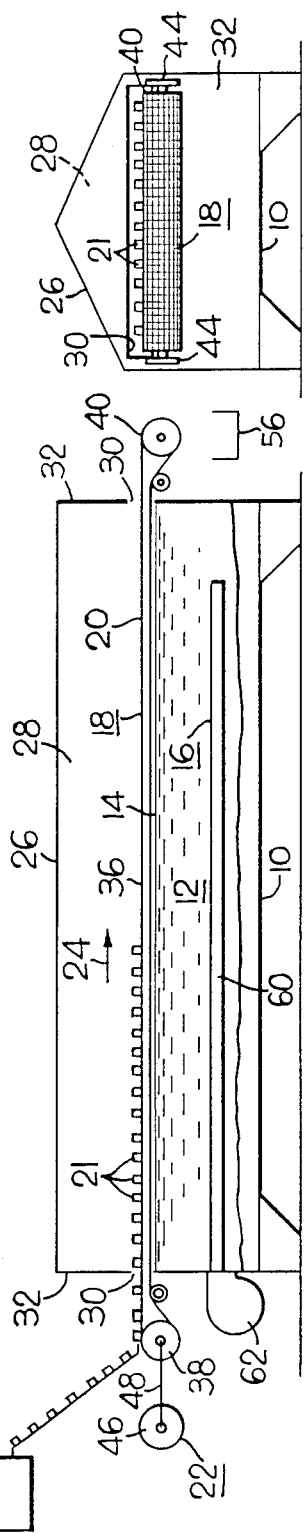
FIG. 3 is an end elevation view of the apparatus of FIGS. 1 and 2.
Figure 2:
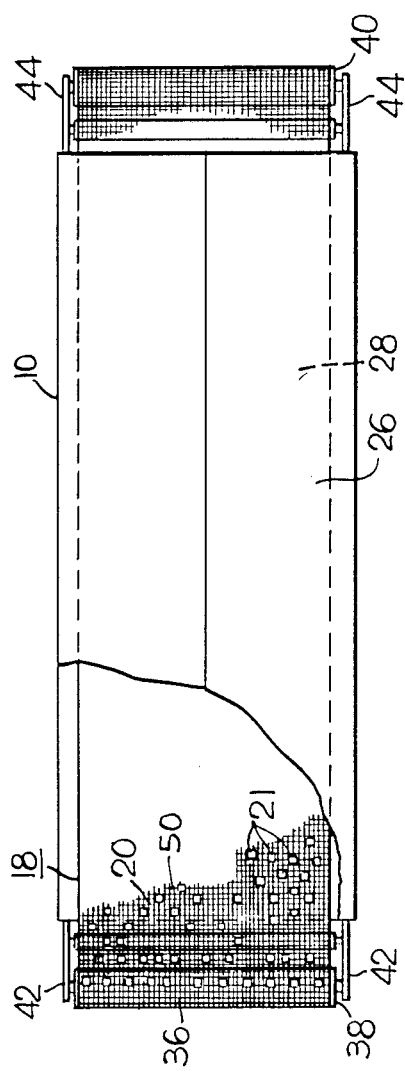
FIG. 2 is a top plan view of the apparatus of FIG. 1.
Figure 1:
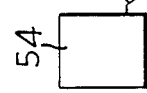
FIG. 1 is a side elevation view, with portions broken away, of the apparatus in accordance with the invention.

Referring to FIGS. 1, 2 and 3, the apparatus in accordance with the invention generally comprises a container 10 in which there is disposed a body of water 12 having a water surface 14; means 16 for heating the body of water 12 to the boiling point and maintaining it there so that it produces a continuous supply of hot water-vapor; a conveyor 18 comprising a perforated conveyor portion or conveyor surface 20 for receiving diced or sliced discrete pieces 21 of vegetables, such as potatoes or the like, and disposed closely above, but out of contact with the water surface 14; means 22 for moving conveyor surface 20 in the direction of arrow 24 relative to the body of water 12; and an enclosure 26 disposed over the body of water 12 and conveyor surface 20 and defining a chamber 28 for entrapping the hot water-vapor in a position where the vegetable pieces 21 are exposed thereto and cooked thereby, said enclosure 26 having at least one aperture 30 therein communicating with the atmosphere outside of the apparatus so that the hot water-vapor is maintained at substantially atmospheric pressure.

In a preferred embodiment of the apparatus, enclosure 26 is mounted on container 10 and both are fabricated of stainless steel. Enclosure 10 has a triangular cross-sectional shape so that chamber 28 therein is relatively compact and thermally efficient. Enclosure 10 has two end walls 32, each of which is provided with an aperture 30 which serves two purposes; namely, communication between chamber 28 and atmosphere and accommodation of the ends of conveyor 18 therethrough.

Conveyor 18 comprises an endless flexible portion 36, which includes the perforated surface 20 on its upper flight, and a pair of rollers 38 and 40 rotatably supported on container 10 by support brackets 42 and 44, respectively, and around which the endless flexible conveyor portion 36 is disposed. Roller 38 is a driven roller which is driven by an electric motor 46 through a drive mechanism 48 and roller 40 is an idler roller. Conveyor 18 is operated at such a speed that its perforated surface 20 on which the pieces 21 are disposed require about five minutes to traverse the distance between the two end walls 32 of enclosure 10. The endless flexible portion 36 of conveyor 18 preferably takes the form of a wire screen having a large number of perforations 50 therethrough, or could take the form of a series of hingedly interconnected perforated metal plates (not shown). The perforated conveyor surface 20 is disposed so as to be as close as possible to the water surface 14 without creating a risk that the vegetable pieces 21 will make contact with the water surface. One end (the left in FIG. 1) of conveyor 18 projects from enclosure 10 and serves as an infeed end onto which uncooked vegetable pieces 21 can be continuously fed from a suitable source 54. The other end (the right in FIG. 1) of conveyor 18 projects from enclosure 10 and serves as a discharge end from which cooked vegetable pieces 21 are continuously discharged into a receptacle 56.

The means 16 for heating and maintaining the body of water 12 at a boil so as to produce hot-water vapor preferably comprises a heating element 60 which is disposed within the body of water 12. Heating element 60 takes the form of a flue through which flame and hot gas is fed from an oil or gas-fired motor-driven flame generator 62 but could take the form of an electric heating coil (not shown) energized from an electric power source (not shown).

The method in accordance with the invention generally consists of the steps of heating a body of water to its boiling point so as to produce hot water-vapor; confining said hot water-vapor in an enclosed space immediately above the surface of the body of water at substantially atmospheric pressure and disposing sliced or diced vegetables in said enclosed space in substantially non-overlapped, non-contacting relationship for a period of time sufficient to effect hot water-vapor cooking thereof.

The general method, as carried out on the apparatus disclosed herein consists of the following steps: Heating the body of water 12 so as to generate and maintain a continuous supply of hot water vapor in chamber 28 of enclosure 10; operating conveyor 18 so that perforated surface 20 moves in the direction of arrow 24 at the requisite speed; continuously delivering a supply of uncooked vegetable pieces 21 to the infeed end of the operating conveyor 18 at a rate of speed adequate to ensure that the pieces 21 do not substantially overlap or contact one another; transporting the pieces 21 through the chamber 28 wherein they are continuously and evenly subjected on all sides to hot water-vapor to effect cooking thereof; and continuously discharging the cooked pieces from the discharge end of conveyor 18 into the receptacle 56.

I claim:

1. Apparatus for cooking diced or sliced vegetables comprising:

a container for a body of water;

means to heat and maintain said body of water at its boiling point so as to produce steam-free hot water vapor;

a movable conveyor surface having interstices therethrough for admitting hot water vapor therethrough and disposed above and out of contact with said body of water but as close as possible to said body of water;

means for continuously moving said conveyor surface relative to said body of water, said conveyor surface being adapted to have diced or sliced vegtables disposed thereon in non-overlapping, non-contacting relationship with each other;

and an enclosure located over said body of water and over a portion of said conveyor for confining said hot water-vapor therein and for exposing the diced or sliced vegetables on said portion of said conveyor thereto, said enclosure having an aperture therein communicating with atmosphere whereby said hot water-vapor is maintained substantially at atmospheric pressure.

* * * * *